Oct. 25, 1960  J. HENDRICKSON  2,957,368
DRIVE MECHANISM FOR MACHINE TOOL CARRIAGES
Filed June 23, 1958  3 Sheets-Sheet 1

Inventor
Jack Hendrickson

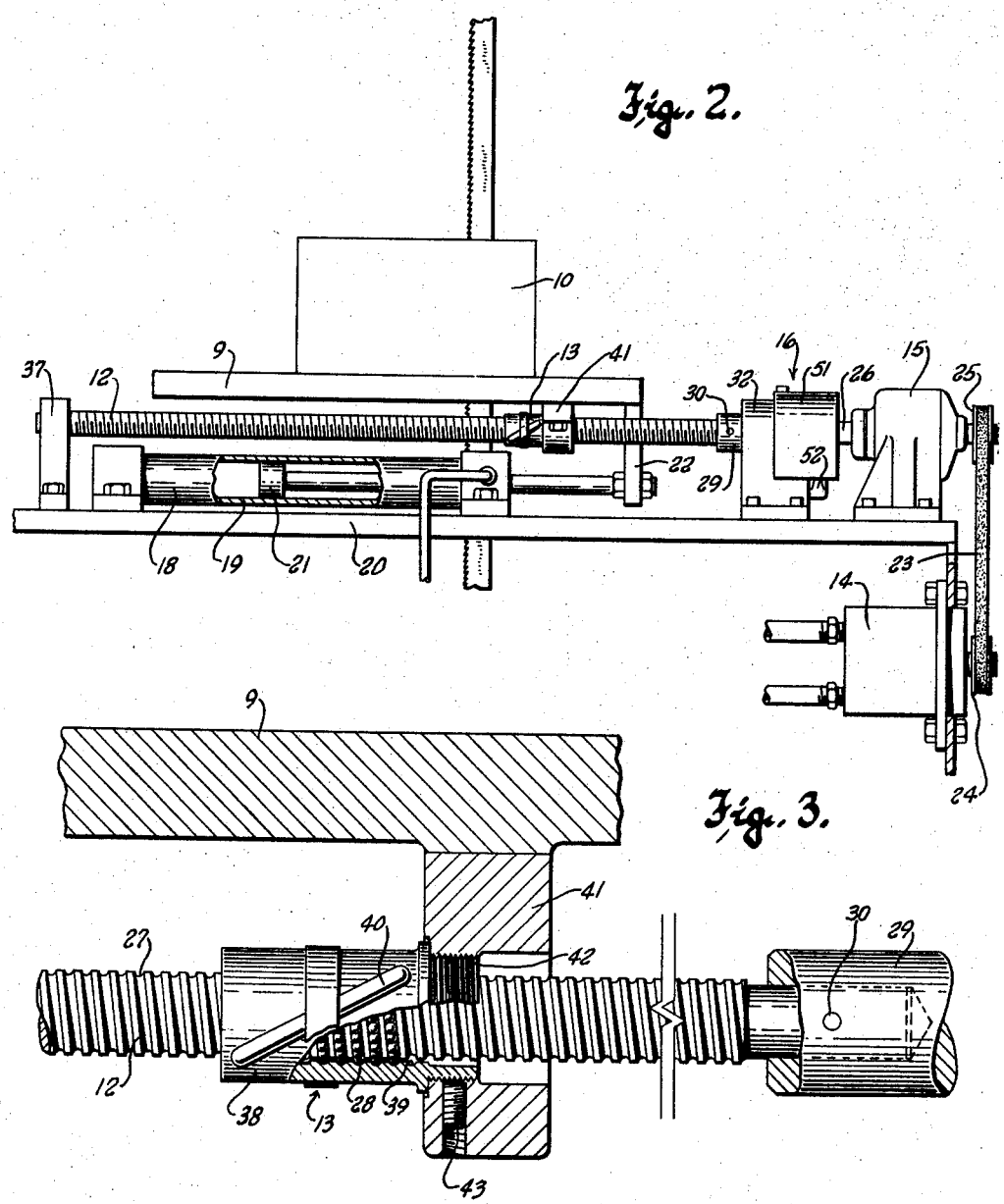

Oct. 25, 1960 J. HENDRICKSON 2,957,368
DRIVE MECHANISM FOR MACHINE TOOL CARRIAGES
Filed June 23, 1958 3 Sheets-Sheet 3

Inventor
Jack Hendrickson
By
Attorney

United States Patent Office 2,957,368
Patented Oct. 25, 1960

2,957,368
DRIVE MECHANISM FOR MACHINE TOOL CARRIAGES

Jack Hendrickson, Hopkins, Minn., assignor to Continental Machines, Inc., Savage, Minn., a corporation of Minnesota Filed June 23, 1958, Ser. No. 743,911

1 Claim. (Cl. 74—665)

This invention relates to machine tools having reciprocating work carrying carriages to carry work into and out of the cutting zone of the machine, and refers more particularly to the actuating mechanism by which the carriage is propelled.

In certain machine tools of the band type, such as band saws and the like, the band travels in a fixed orbit, with a stretch thereof moving straight down through the cutting zone of the machine. Hence the work piece to be cut must be moved into and through the cutting zone. Larger machines of this type are often used strictly for straight line cutting as for instance for refacing or shanking heavy forging die blocks, trimming large castings, splitting big bearings and bushings, ripping heavy plates, and slabbing large billets. For many of these operations it is especially desirable that the work be mounted on a reciprocating carriage and that the carriage be automatically and positively advanced to carry the work into the cutting zone at a uniform rate depending upon the nature of the material being cut and cutting efficiency of the saw band. Obviously, though, whatever this optimum feed rate might be, it will be relatively slow. A screw turning in a nut is perhaps the most ideal means of producing this slow steady feed, but it is the least desirable for retracting the carriage. A much faster motion producing means should be employed for this purpose.

The combination of a slow feed or advance with a fast retraction stroke is of course nothing new in machine tools, but heretofore, where the slow speed was produced by a screw and some other means was employed to obtain fast retraction, the nut always had to be disconnected in some way from the screw. Usually a split nut was used. Sometimes only a half nut, but always some mechanism had to be provided to disengage the nut from the feed screw at the end of each feed stroke.

The present invention employs a feed screw held against endwise movement on the base of the machine and threaded in a nut fixed to the carriage to produce the desired slow, steady feed motion, but contrary to past practice obviates the need for disengaging the nut from the screw at the end of the feed stroke.

Therefore, it is an object of the present invention to provide a feed screw type of actuator for propelling a movable member in one direction which takes advantage of the desirable properties of the so-called ball nut and which permits rapid motion of the movable member in the other direction by means of a hydraulic cylinder or the like without the necessity for effecting disengagement between the feed screw and its cooperating nut.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 2 is a side view, with portions broken away and shown in section, of the carriage actuating mechanism of this invention;

Figure 3 is an enlarged side elevational view of the feed screw and nut of the carriage propulsion mechanism of this invention, portions being cut away.

Figure 1:
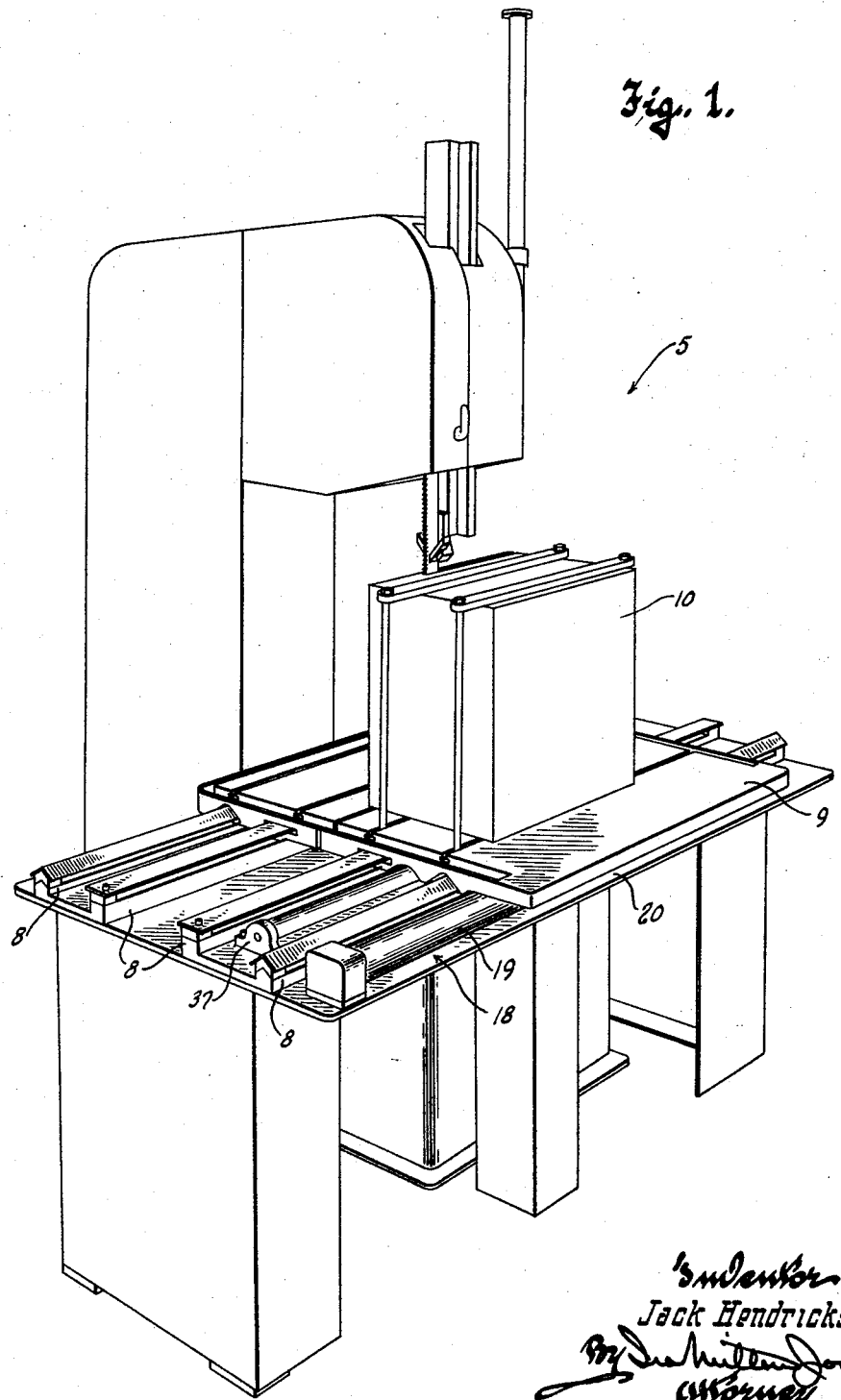
Figure 1 is a perspective view of a band sawing machine having a work supporting carriage which is actuated by a mechanism embodying the principles of this invention.
Figure 4:
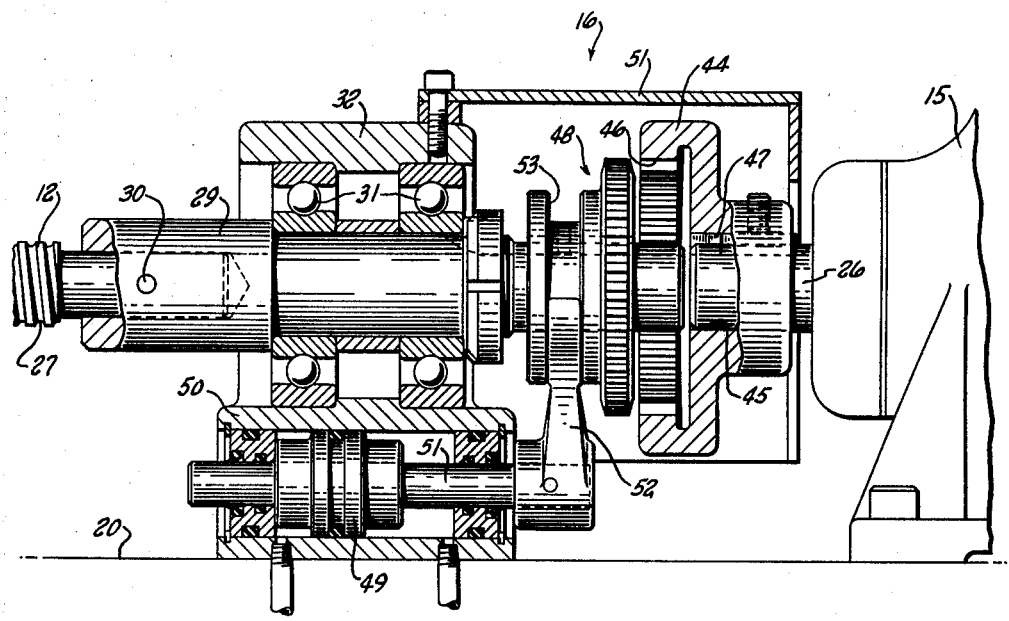
Figure 4 is a view partly in side elevation and partly in section, showing one form of clutch device which may be employed to connect the feed screw with its drive unit.

Referring now more particularly to the accompanying drawings, in which like numerals designate like parts throughout the several views, the numeral 5 designates generally a band type of machine tool which in this case is shown as a band saw and which includes an endless saw band trained over drive and supporting pulleys (not shown) for orbital motion. One straight vertical stretch of the band extends through a cutting zone in which work is adapted to be presented to the cutting edge of the blade.

Fixed on the base of the machine are ways 8 upon which a carriage 9 is mounted for translation in opposite directions, to carry a piece of work 10 back and forth to be successively cut by the band saw.

The mechanism by which the carriage is advanced (that is, propelled in the direction to engage the work with the cutting edge of the saw) comprises, in general, a feed screw 12 with which a nut 13 is engaged, and a motor 14 which rotatably drives the feed screw through a speed reducer 15 and a clutch 16. The mechanism by which the carriage is rapidly retracted comprises a hydraulic motor 18 having a cylinder 19 fixed to the frame 20 of the machine with its axis parallel to the feed screw, and a piston 21 slidable in the cylinder and connected to a bracket 22 which is rigidly secured to the carriage.

The motor 14 may be either hydraulic or electric, but is preferably a hydraulic motor of the rotary type, so that the entire mechanism can be operated from a single source of hydraulic fluid under pressure (not shown). The motor is connected with the speed reducer by means of a belt 23 trained over driving and driven pulleys 24 and 25, and the clutch is directly coupled to the output shaft 26 of the speed reducer, as described hereinafter.

The feed screw comprises a shaft having a helical groove 27 of a size to accommodate balls 28. One end portion of the feed screw is supported by the driven shaft 29 of the clutch, to which it is suitably fixed as by being secured in a coaxial well therein by means of a pin 30, and the opposite end of the feed screw is journaled in a fixed bearing block 37. The clutch shaft 29 is rotatably supported and constrained against endwise displacement by bearings 31 mounted in a supporting member 32 fixed on the machine frame.

The nut 13 is of the free running ball type, like those shown in Patents Nos. 2,636,397 and 2,783,656. Hence it comprises a cylinder 38 having a helical groove 39 opening to its bore, in which the balls 28 are confined and roll along as the feed screw rotates relative to the nut, to provide a substantially frictionless connection between the feed screw and the nut. An axially extending passage 40 in the nut cylinder connects the opposite ends of its helical groove to enable balls which have traversed the helical groove in the nut from one end to the other to return to their starting point.

Projecting from the carriage is a bracket 41 having a bore 42 therethrough into which one end of the nut is threaded, and a set screw 43 in the bracket engages the nut and prevents it from rotating relative to the bracket so as to maintain a fixed, rigid connection between the nut and the carriage by which rotation of the feed screw in one direction is translated into advancing movement of the carriage along the ways 8.

It will be apparent that if the carriage is moved along the ways by a force other than that exerted through the nut, the feed screw will tend to be rotated by the nut moving along it. If an ordinary follower nut were used with the feed screw, its friction with the screw would be too great to permit the screw to rotate in consequence of such carriage motion, unless the screw had an extraordinarily coarse pitch, but this would render it unsuitable for work feeding propulsion of the carriage. The ball nut, however, is practically frictionless; hence the screw is easily rotated by axial movement of the nut as the carriage is retracted, provided, of course, that the screw can rotate quite freely. Accordingly, the use of the ball nut permits the desired quick retraction of the carriage without disrupting the connection between the nut and the screw as was heretofore necessary where a slow screw produced motion in one direction was combined with a rapid motion in the other direction produced by means other than the screw.

To insure that only a minimum of force will be required to turn the feed screw during retraction of the carriage, the motor and speed reducer are disconnected from the feed screw by means of the clutch 16, which is disengaged at the end of the advancing or feed movement of the carriage and reengaged at the conclusion of its retraction.

The clutch is conjointly supported by the fixed member 32 and by the speed reducer. Coaxially secured to the output shaft 26 of the speed reducer is a female clutch element 44 having a bore 45 therethrough in which the speed reducer output shaft is received and a counterbore 46 which provides a coaxial well opening away from the speed reducer. The female clutch member is constrained to rotate with the speed reducer output shaft by means of a key 47, and the side of the well 46 therein is toothed to interengage with similar teeth on the exterior of a male clutch member 48. The male clutch member is slidably splined on the clutch shaft 29 to which the feed screw is coaxially secured, so that the male clutch member may be axially moved into and out of driving engagement with the female clutch member.

The male clutch member is actuated to its engaged and disengaged positions by means of a hydraulically operated piston 49, axially slidable in a fixed cylinder 50 that may be formed in the base portion of the fixed clutch supporting member 32. Secured to a projecting stem 51 on the piston is a yoke 52 which is engaged with a collar 53 on the male clutch member. Ports in the cylinder 50, near the ends thereof, provide for admission of hydraulic fluid to the cylinder at one side or the other of the piston to move the piston back and forth and thus engage and disengage the clutch. The flow of hydraulic fluid into the cylinder 50 is of course coordinated with its flow into and out of the hydraulic carriage retracting cylinder 19 to assure that the clutch will be disengaged at all times that the carriage is being retracted.

The clutch mechanism is preferably enclosed in a hood-like housing or cover 51, secured to the fixed clutch supporting member 32.

It will be understood that the clutch mechanism described above is illustrative, and that any suitable type of clutch mechanism may be employed which will provide for ready connection and disconnection of the speed reducer from the feed screw. It will also be understood that the units which are herein described as hydraulically operated could also be operated pneumatically, or could be replaced with other equivalent mechanisms operated by other means.

From the foregoing description taken together with the accompanying drawings it will be apparent that this invention provides a mechanism for actuating a work supporting carriage in a band type of machine tool, or for actuating any similar movable member whereby motion in one direction may be effected at a slow, steady rate, providing for substantial force to be applied to the member being moved, while motion in the other direction is effected at a much faster rate; and it will also be apparent that this invention provides a feed screw type of actuator by which a movable member is propelled in one direction and by which rapid movement of the member in the opposite direction may be effected without disengagement of the nut from the feed screw.

What is claimed as my invention is:

In a machine tool, the combination of: a frame; a carriage; means slidably mounting the carriage on the frame for reciprocatory movement in forward work feeding and reverse work retracting directions; an elongated feed screw; bearings carried by the frame supporting the feed screw for rotary movement on an axis parallel to the directions of carriage movement and with the feed screw located beneath the carriage; a drive motor; clutch means readily disengageably connecting the drive motor with said feed screw, whereby the feed screw may be rotatably driven in one direction by said motor; a ball nut; means securing the ball nut to the carriage; said ball nut being threaded onto the feed screw to provide a mutual motion translating connection between the feed screw and the carriage, whereby rotation of the feed screw in one direction by said drive motor effects slow forceful forward work feeding movement of the carriage; a hydraulic cylinder; means connecting the movable work performing element of the hydraulic cylinder with the carriage and thereby constraining the carriage to move with said work performing element of the cylinder so that the carriage and the ball nut secured thereto are rapidly movable in the reverse work retracting direction substantially unhindered by the feed screw when the latter is declutched from said drive motor and therefore free to rotate rapidly in its other direction; and means to concomitantly energize the hydraulic cylinder to produce said rapid work retracting motion of the carriage and declutch the drive motor from the feed screw.

References Cited in the file of this patent

UNITED STATES PATENTS

| | | |
|---|---|---|
| 2,367,492 | Fickett et al. | Jan. 16, 1945 |
| 2,620,683 | Geyer | Dec. 9, 1952 |
| 2,791,922 | Robinson | May 14, 1957 |